United States Patent
Liu

(10) Patent No.: US 10,931,575 B2
(45) Date of Patent: Feb. 23, 2021

(54) MULTI-TENANT VIRTUAL PRIVATE NETWORK BASED ON AN OVERLAY NETWORK

(71) Applicant: Nokia Technologies Oy, Espoo (FI)

(72) Inventor: Xiaolong Liu, Wuxi (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 97 days.

(21) Appl. No.: 16/091,369

(22) PCT Filed: Apr. 13, 2016

(86) PCT No.: PCT/CN2016/079180
§ 371 (c)(1),
(2) Date: Oct. 4, 2018

(87) PCT Pub. No.: WO2017/177401
PCT Pub. Date: Oct. 19, 2017

(65) Prior Publication Data
US 2019/0158397 A1 May 23, 2019

(51) Int. Cl.
*G06F 13/00* (2006.01)
*H04L 12/715* (2013.01)
*H04L 12/46* (2006.01)
*H04L 12/741* (2013.01)

(52) U.S. Cl.
CPC .......... *H04L 45/64* (2013.01); *H04L 12/4633* (2013.01); *H04L 12/4641* (2013.01); *H04L 45/745* (2013.01); *H04L 2012/4629* (2013.01)

(58) Field of Classification Search
CPC ... H04L 45/64; H04L 45/745; H04L 12/4633; H04L 12/4641; H04L 2012/4629
(Continued)

(56) References Cited

U.S. PATENT DOCUMENTS

| 8,098,656 B2 | 1/2012 | Lapuh et al. |
| 8,978,031 B2 | 3/2015 | Kamble et al. |

(Continued)

FOREIGN PATENT DOCUMENTS

| CN | 101079775 A | 11/2007 |
| CN | 101547100 A | 9/2009 |

(Continued)

OTHER PUBLICATIONS

Summons to Attend Oral Proceedings foe European Application No. 16 898 220.5 dated Jun. 18, 2020, 7 pages.

(Continued)

*Primary Examiner* — Kenneth R Coulter
(74) *Attorney, Agent, or Firm* — Alston & Bird LLP

(57) ABSTRACT

According to an example embodiment, a technique for operating a virtual private network (VPN) service in a multi-tenant data center is provided, the technique comprising operating, in the data center, a multi-tenant VPN server to relay data packets between a VPN tunnel that connects the multi-tenant VPN server to a remote network of a tenant and an overlay network service that implements the VPN for said tenant within the data center, wherein the data packets between the multi-tenant VPN server and the overlay network service are carried in a virtual local area network, VLAN, assigned for said tenant, and wherein the multi-tenant VPN server stores a multi-tenant forwarding table that stores a mapping between a tenant and a VLAN assigned for the tenant for a plurality of tenants.

20 Claims, 6 Drawing Sheets

(58) Field of Classification Search
USPC .................................................. 709/201, 249
See application file for complete search history.

(56) References Cited

U.S. PATENT DOCUMENTS

| | | | |
|---|---|---|---|
| 9,008,085 | B2 | 4/2015 | Kamble et al. |
| 9,065,680 | B2 | 6/2015 | Kermarec et al. |
| 9,331,938 | B2* | 5/2016 | Davie ...................... H04L 49/70 |
| 10,117,285 | B2* | 10/2018 | Nadella ................. H04W 76/12 |
| 10,320,671 | B2* | 6/2019 | Davie ...................... H04L 49/70 |
| 2002/0156828 | A1 | 10/2002 | Ishizaki et al. |
| 2013/0142201 | A1 | 6/2013 | Kim et al. |
| 2013/0223454 | A1 | 8/2013 | Dunbar et al. |
| 2013/0283364 | A1 | 10/2013 | Chang et al. |
| 2013/0287026 | A1* | 10/2013 | Davie ...................... H04L 49/70 |
| | | | 370/392 |
| 2014/0201733 | A1 | 7/2014 | Benny et al. |
| 2014/0307744 | A1 | 10/2014 | Dunbar et al. |
| 2014/0362859 | A1 | 12/2014 | Addanki et al. |
| 2015/0172183 | A1 | 6/2015 | DeCusatis et al. |
| 2015/0271067 | A1 | 9/2015 | Li et al. |
| 2016/0087941 | A1 | 3/2016 | Mudigonda et al. |
| 2016/0212049 | A1* | 7/2016 | Davie ...................... H04L 49/70 |
| 2016/0226753 | A1* | 8/2016 | Young ..................... H04L 47/17 |
| 2016/0261496 | A1 | 9/2016 | Chang |
| 2017/0181210 | A1* | 6/2017 | Nadella ................. H04W 48/16 |
| 2018/0270084 | A1* | 9/2018 | Pazmany .............. H04L 61/103 |

FOREIGN PATENT DOCUMENTS

| | | |
|---|---|---|
| CN | 103795631 A | 5/2014 |
| CN | 104009919 A | 8/2014 |
| CN | 104106242 A | 10/2014 |
| CN | 104145458 A | 11/2014 |
| CN | 104168311 A | 11/2014 |
| CN | 104601427 A | 5/2015 |
| EP | 2709316 A1 | 3/2014 |
| WO | 2013/154813 A1 | 10/2013 |
| WO | 2016/003489 A1 | 1/2016 |

OTHER PUBLICATIONS

Extended European Search Report received for corresponding European Patent Application No. 16898220.5, dated Aug. 19, 2019, 8 pages.

"Network Virtualization: a Next Generation Modular Platform for the Data Center Virtual Network", Bradhedlund.com, Retrieved on Sep. 24, 2018, Webpage available at : http://bradhedlund.com/2013/01/28/network-virtualization-a-next-generation-modular-platform-for-the-virtual-network/.

"Catalyst 3560 Switch Software Configuration Guide", Cisco, Retrieved on Sep. 24, 2018, Webpage available at : https://www.cisco.com/c/en/us/td/docs/switches/lan/catalyst3560/software/release/12-2_55_se/configuration/guide/3560_scg/swvlan.html.

"Multi-Tenant Site-to-Site (S2S) VPN Gateway with Windows Server 2012 R2", Networking Blog, Retrieved on Sep. 25, 2018, Webpage available at : https://blogs.technet.microsoft.com/networking/2013/09/28/multi-tenant-site-to-site-s2s-vpn-gateway-with-windows-server-2012-r2/.

"Cloud Scale Multitenant Networking Stack", Networking Blog, Retrieved on Sep. 25, 2018, Webpage available at : https://blogs.technet.microsoft.com/networking/2013/08/02/cloud-scale-multitenant-networking-stack/.

"Data Center Overlay Technologies", Cisco, 2013, pp. 1-19.

Yong et al., "Network Virtualization Edge (NVE) draft-yong-nvo3-nve-04", IETF Network working group, Jun. 18, 2014, pp. 1-20.

Rosen et al., "BGP/MPLS IP Virtual Private Networks (VPNs)", RFC: 4364, Network Working Group, Feb. 2006, pp. 1-47.

"Virtual Private LAN Service", Wikipedia, Retrieved on Sep. 25, 2018, Webpage available at : https://en.wikipedia.org/wiki/Virtual_Private_LAN_Service.

"Darpa Internet Program Protocol Specification", RFC: 791, Sep. 1981, 50 pages.

Deering et al., "Internet Protocol, Version 6 (IPv6) Specification", RFC: 1883, Network Working Group, Dec. 1995, pp. 1-37.

Aboba et al., "Extensible Authentication Protocol (EAP)", RFC: 3748, Network Working Group, Jun. 2004, pp. 1-67.

Garg et al., "NVGRE: Network Virtualization Using Generic Routing Encapsulation", RFC: 7637, Independent Submission, Sep. 2015, pp. 1-17.

International Search Report and Written Opinion received for corresponding Patent Cooperation Treaty Application No. PCT/CN2016/079180, dated Jan. 6, 2017, 12 pages.

Office Action and Search Report for Chinese Application No. 201680084585.7 dated Sep. 22, 2020, 23 pages.

* cited by examiner

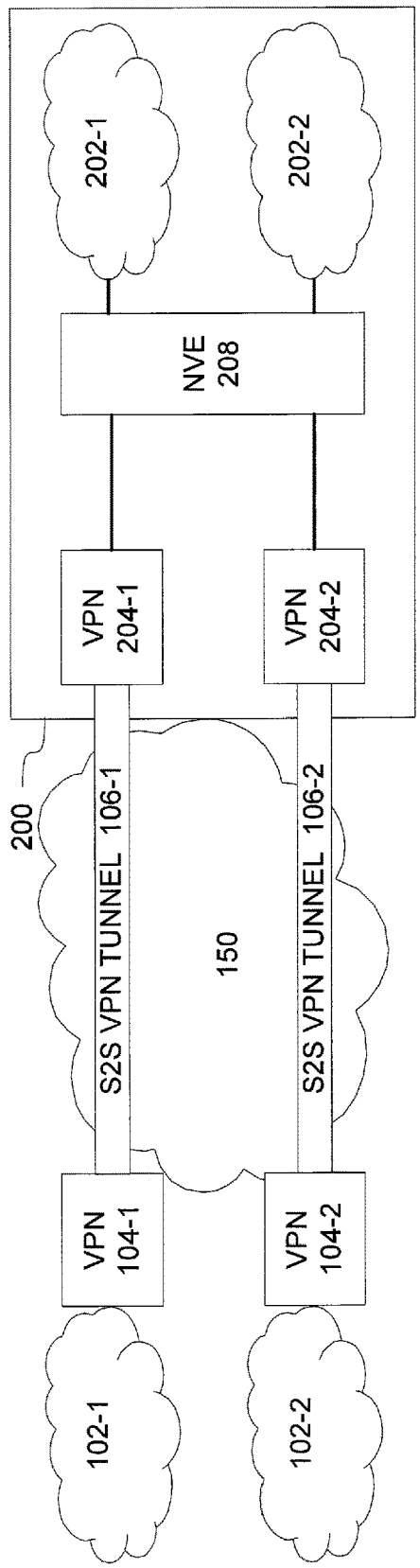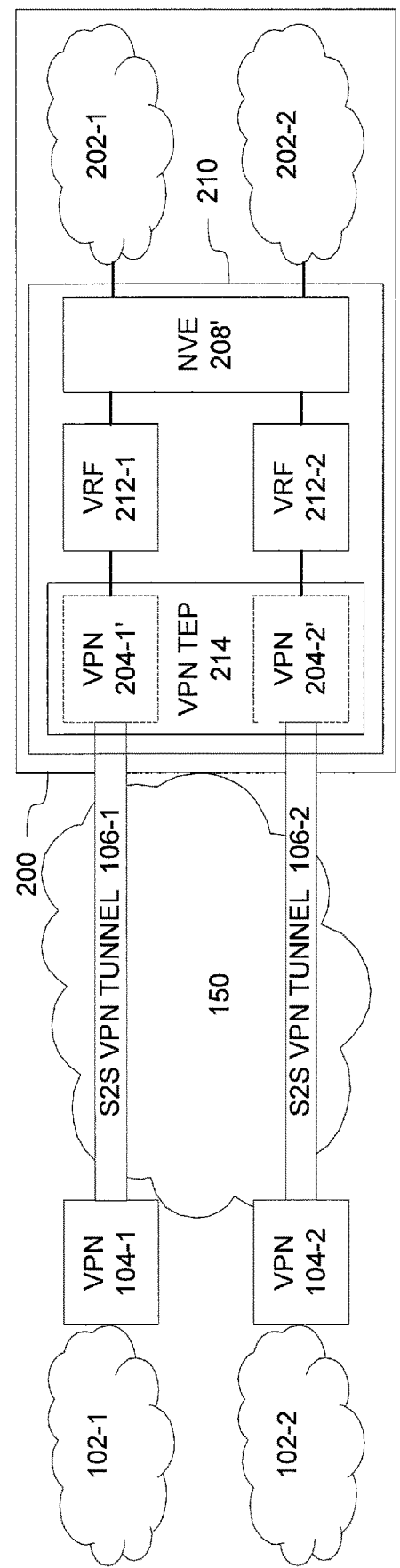

500

Route, in the overlay network $OID(k)$, a data packet of an overlay tunnel that is targetting a remote network by using $IVX(k)$ as the L3 next hop address
502

Terminate, in the VGW, the overlay tunnel and forward the data packet to the VPN server via VLAN identified by the $VLAN\text{-}ID(k)$
504

Obtain tenant identification $TID(k)$ that identifies the tenant $k$ on basis the VLAN via which the data packet was received from the VGW
506

Identify the VPN tunnel towards the remote network on basis of the $TID(k)$
508

Terminate the VLAN and forward the data packet received via the VLAN to the identified VPN tunnel
510

Receive a data packet from a remote network via a VPN tunnel and obtain tenant identification TID(k) associated with the VPN tunnel
602

Determine VLAN-ID(k) associated with TID(k)
604

Forward the data packet received via the VPN tunnel to the VGW via the VLAN identified by VLAN-ID(k)
606

Identify an overlay network OID(k) associated with the VLAN-ID(k)
608

Forward the received data packet to its destination via an overlay tunnel of the identifed overlay network OID(k)
610

Figure 6

MULTI-TENANT VIRTUAL PRIVATE NETWORK BASED ON AN OVERLAY NETWORK

RELATED APPLICATION

This application was originally filed as PCT Application No. PCT/CN2016/079180 filed Apr. 13, 2016.

TECHNICAL FIELD

Non-limiting example embodiments of the present invention relate to provision of a multi-tenant virtual private network (VPN) using overlay network technology. In particular, some example embodiments of the present invention relate to provision of such VPN networks in a data center

BACKGROUND

Overlay network technologies that enable decoupling between a physical network and a virtual network configured on top of the physical network are widely used e.g. in data centers that provide network services for a plurality of users and/or organizations, referred herein also as tenants. In this context, a suitable overlay network technology allows sharing the available physical network resources in a desired manner for a plurality of tenants while at the same time providing appropriate isolation between the tenants to ensure privacy. A tenant is able to access its dedicated virtual network in the data center via an entity referred to as a virtual private network (VPN) server, which may also be referred to as a VPN gateway (VPN GW).

As an example in this regard, FIG. 1 illustrates a block diagram of some logical components of an example arrangement for providing virtual networks 201-1, 202-1 in a data center 200 for multiple tenants. In FIG. 1, a first local network 102-1 in a first site is coupled via a first secure connection through a network 150 to the virtual network 202-1 dedicated for the tenant of the first local network 102-1 and a second local network 102-2 in a second site is coupled via a second secure connection through the network 150 to the virtual network 202-2 dedicated for the tenant of the second local network 102-2. The (first) secure connection between the first local network 102-1 and the data center 200 involves a first site-to-site (S2S) VPN tunnel 106-1 between a first VPN server 104-1 that serves the first local network 102-1 and a first VPN server 204-1 of the data center 200, whereas the (second) secure connection between the second local network 102-2 and the data center 200 involves a second S2S VPN tunnel 106-2 between a second VPN server 104-2 that serves the second local network 102-2 and a second VPN server 204-2 of the data center 200. The network 150 through which the S2S VPN tunnels 106-1, 106-2 are provided may represent, for example, the Internet.

Still continuing with description of the example depicted in FIG. 1, each of the VPN servers 204-1, 204-2 in the data center is provided as a separate VPN server device that is dedicated for serving a single tenant. The VPN servers 204-1, 204-2 are coupled to a network virtualization edge (NVE) entity 208, which arranges for the mapping of the physical network resources of the data center into the respective virtual networks 202-1, 202-2 and manage routing of data between the VPN servers 204-1, 204-2 and the respective virtual networks 202-1, 202-2 within the data center 200. Such a straightforward approach that relies on dedicated physical VPN servers in the data center provides, typically, high performance while on the other hand, when serving a relatively high number of tenants, the implementation cost may be significant due to separate VPN server required for each of the tenants.

As another example, FIG. 2 illustrates a block diagram of some logical components of a variation of the solution outlined above in context of FIG. 1. Therein a single server device 210 comprises a VPN tunnel end point (TEP) module 214 that is arranged to provide a respective dedicated virtual network interface (e.g. a respective virtual network interface card (vNIC)) for each of the tenants therein. In this regard, the TEP module 214 may comprise a policy engine that employs predefined tenant-specific policy information stored in a routing table in the server device 204, thereby at least conceptually providing VPN server functions 204-1' and 204-2' for processing and routing data traffic for the respective tenants. The single server device 210 further hosts a NVE module 208' that corresponds to the NVE entity 208 of FIG. 1 and that hence arranges for the mapping of the physical network resources of the data center 200 into the respective virtual networks 202-1, 202-2 for each of the tenants. Each of the VPN server functions 204-1', 204-2' in the TEP module 214 is coupled to the NVE module 208' via a respective virtual routing and forwarding (VRF) function 212-1, 212-2 that arranges for routing of data between the VPN server functions 204-1', 204-2' and the respective virtual networks 202-1, 202-2 within the data center 200.

Hence, each tenant may access his/her network resources available in the data center 200 by connecting to its dedicated VPN server function 204-1', 204-2' via the respective virtual network interface of the VPN TEP module 214. This approach enables efficient re-use of hardware by virtualizing also the interface towards the remote local networks 102-1, 102-2 and hence enables savings in implementation cost while also allowing rather straightforward reconfiguration for adding/removing tenants via reconfiguration of the single server device 210. On the other hand, this approach involves some computational complexity and latency in packet processing through the VRF entities 212-1, 212-2 and it also couples the implementation of the VPN server functions 204-1', 204-2' into the overlay network technology provided in the NVE module 208', thereby resulting in limited design and re-configuration options.

SUMMARY

According to an example embodiment, a method for operating a virtual private network (VPN) service in a multi-tenant data center is provided, the method comprising operating, in the data center, a multi-tenant VPN server to relay data packets between a VPN tunnel that connects the multi-tenant VPN server to a remote network of a tenant and an overlay network service that implements the VPN for said tenant within the data center, wherein the data packets between the multi-tenant VPN server and the overlay network service are carried in a virtual local area network, VLAN, assigned for said tenant, and wherein the multi-tenant VPN server stores a multi-tenant forwarding table that stores a mapping between a tenant and a VLAN assigned for the tenant for a plurality of tenants.

According to another example embodiment, an apparatus for operating a VPN service in a multi-tenant data center is provided, the apparatus configured to relay data packets between a VPN tunnel that connects the apparatus to a remote network of a tenant and an overlay network service that implements the VPN for said tenant within the data center, wherein the data packets between the apparatus and the overlay network service are carried in a virtual local area network, VLAN, assigned for said tenant, and wherein the apparatus stores a multi-tenant forwarding table that stores a mapping between a tenant and a VLAN assigned for the tenant for a plurality of tenants.

According to another example embodiment, an apparatus for operating a VPN service in a multi-tenant data center is provided, the apparatus comprising a means for relaying data packets between a VPN tunnel that connects the apparatus to a remote network of a tenant and an overlay network service that implements the VPN for said tenant within the data center, wherein the data packets between the apparatus and the overlay network service are carried in a virtual local area network, VLAN, assigned for said tenant, and wherein the apparatus stores a multi-tenant forwarding table that stores a mapping between a tenant and a VLAN assigned for the tenant for a plurality of tenants.

According to another example embodiment, a computer program is provided, the computer program comprising computer readable program code configured to cause performing at least the method according to an example embodiment described in the foregoing when said program code is executed on a computing apparatus:

The computer program according to an example embodiment may be embodied on a volatile or a non-volatile computer-readable record medium, for example as a computer program product comprising at least one computer readable non-transitory medium having program code stored thereon, the program which when executed by an apparatus cause the apparatus at least to perform the operations described hereinbefore for the computer program according to an example embodiment of the invention.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where FIG. 1 illustrates a block diagram of some components of an arrangement for providing respective virtual networks in a data center for multiple tenants according to an example;

FIG. 2 illustrates a block diagram of some components of another arrangement for providing respective virtual networks in a data center for multiple tenants according to an example;

FIG. 5 depicts a flow diagram according to an example embodiment;

FIG. 6 depicts a flow diagram according to an example embodiment; and

DESCRIPTION OF SOME EMBODIMENTS

Figure 3:
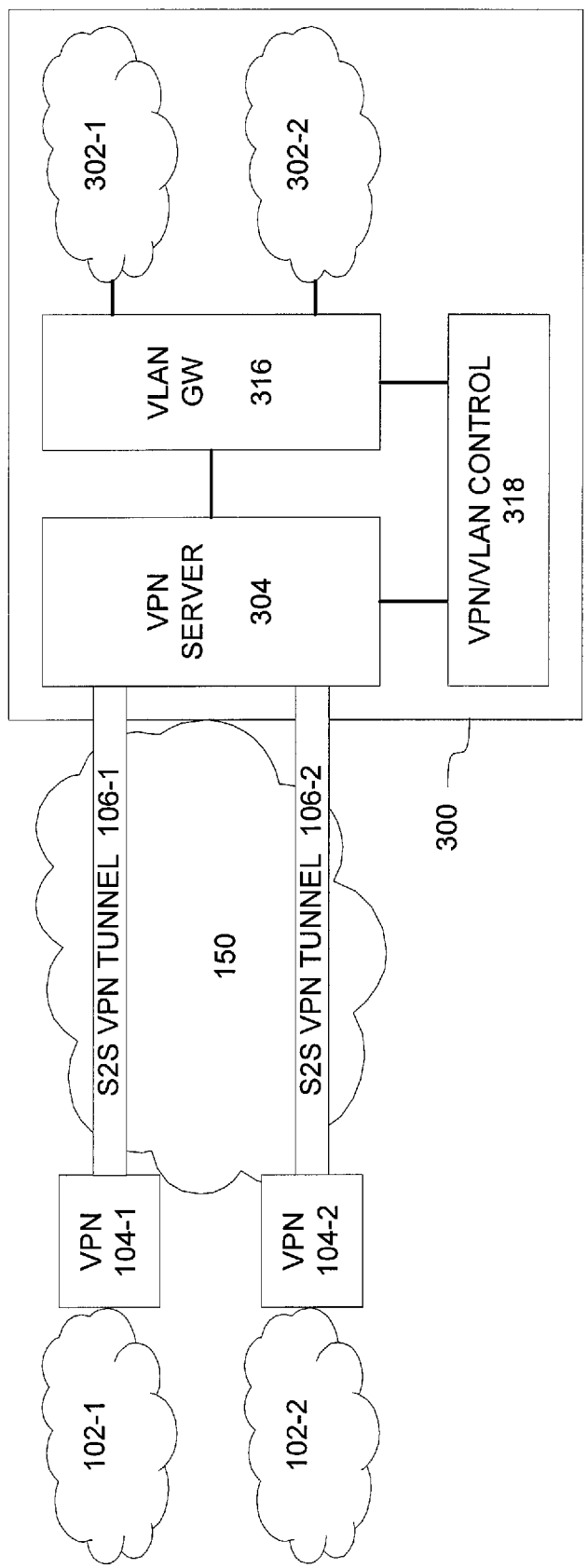
FIG. 3 illustrates a block diagram of some components of another arrangement for providing respective virtual networks in a data center for multiple tenants according to an example embodiment.

FIG. 3 illustrates a block diagram of some logical components of a communication arrangement 100, which serves as a framework for description of various example embodiments. Along the lines of FIGS. 1 and 2, the communication arrangement 100 is depicted with the first local network 102-1 in the first site and the second local network 102-2 in the second site, both communicatively connecting, through the network 150, to network resources provided by the respective virtual networks 202-1, 202-2 in a data center 300, where the connections through the network 150 are provided by respective secure connections, depicted in this example as S2S VPN tunnels 106-1, 106-2 between that connect the VPN servers 104-1, 104-2 that serve, respectively, the first and second local networks 102-1, 102-2 to a VPN server 304 of the data center 300. As discussed in the foregoing, the network 150 may represent, for example, the Internet.

While illustrated in the example of FIG. 3 using two entities, the communication arrangement 100 may involve a plurality of local networks 102-$k$ at respective sites that are connected (or connectable) using respective VPN servers 104-$k$ via the respective S2S VPN tunnels 106-$k$ (or secure connections of other type) through the network 150 to the VPN server 304 of the data center 300. The virtual networks 302-1, 302-2 depicted in FIG. 3, likewise, represent a plurality of virtual networks 302-$k$ that may be applied to provide further network resources in the data center 300 to complement those of the respective local network 102-$k$. Techniques and procedures for establishing, managing and employing secure connections, such as the S2S VPN tunnels 106-$k$, between the VPN servers 104-$k$ and the VPN server 304 are widely known in the art and the description herein does not go into details of such techniques and/or procedures.

In viewpoint of the data center 300, the plurality of local networks 102-$k$ at respective sites appear as remote networks (or remote devices) accessing the data center 300 via the respective secure connections across the network 150. Therefore, in the following we, alternatively, refer to the local networks 102-$k$ as respective remote networks 102-$k$. Similarly, the VPN servers 104-$k$ arranged to serve the respective local (or remote) networks 102-$k$ are referred to as respective remote VPN servers 104-$k$.

The VPN server 304 may, at a high level, operate in a manner similar to that described in the foregoing for the VPN TPE entity 214. Hence, the VPN server 304 may operate a respective dedicated VPN server instances for each of the plurality of tenants, and the remote VPN server 104-$k$ may create the secure connection (e.g. the respective S2S VPN tunnel 106-$k$) to its dedicated VPN server instance via a respective virtual network interface of the VPN server 304, where the VPN server instances may be provided in the VPN server 304 by using a policy engine that employs predefined tenant-specific policy information stored in a routing table in the VPN server 304, thereby at least conceptually providing a respective VPN server function or instance for processing and routing data traffic for each of the tenants served by the VPN server 304. A VPN server instance in the VPN server 304 hence provides a tunnel end point for the respective S2S VPN tunnel 106-$k$. Each VPN server instance in the VPN server 304 is assigned a virtual network identifier (VNID) that uniquely identifies the respective VPN server instance and the S2S VPN tunnel 106-k terminated by the respective VPN server instance.

Each VPN server instance (and hence the respective S2S VPN tunnel 106-2 end point) of the VPN server 304 is further associated with a certain tenant, while (at a given point in time) a certain tenant may be associated with one or more VPN server instances (i.e. there may be one or more secure connections between the remote VPN server 104-k and the VPN server 304 of the data center 300). In this regard, each tenant considered in the VPN sever 304 may be assigned a tenant identification (tenant ID or TID) that uniquely identifies the tenant within the VPN server 304. Thus, associations between the VPN server instances (or S2S VPN tunnels 106) may be defined by mappings between VNIDs and TIDs such that each VNID maps to a single TID, whereas a TID may map to one or more VNIDs.

FIG. 3 further illustrates a virtual local area network gateway (VLAN GW or VGW) 316 and a VPN/VLAN control entity 318. In the following, the latter one is simply referred to as a control entity 318 for improved editorial clarity in this regard. Although illustrated in the example of FIG. 3 as a separate (logical) entity, the control entity 318 or part thereof may be implemented as part of the VPN server 304 (e.g. the functionality of the control entity 318 or part thereof may be implemented using the same device as applied for implementing the VPN server 304). Examples concerning operation of the VPN server 304, the VGW 316 and the control entity 318 and their roles in providing the virtual networks 302-k are described in the following.

Before proceeding into description of operation of elements of the data center 300, we further provide a brief overview regarding provision of the virtual networks 302-k using the physical network available in the data center 300. However, since techniques and procedures for establishing, managing and employing overlay networks are widely known in the art, the description in this regard does not go into details of such techniques and/or procedures.

According to an example, the overlay networks may be configured on the network layer, which is also commonly referred to as layer 3 or as L3. Addressing and transfer of data frames in the network layer relies on logical addresses assigned to hosts of the physical network. Transfer between two logical network layer addresses may involve transfer over one or more physical links between respective physical hosts, which may be referred to as routing of network layer data frames through intermediate hosts. The transfer of data frames in the network layer is carried out according to a network layer protocol, such as the Internet Protocol (IP) (specified e.g. in the RFC 791 (IP version 4) or in the RFC 1883 together with a number of accompanying RFCs (IP version 6)). Examples of applicable overlay network techniques include Virtual Extensible Local Area Network (VXLAN) specified e.g. in RFC 3748, Network Virtualization using Generic Routing Encapsulation (NVGRE) specified e.g. in RFC 7637 and Stateless Transport Tunneling protocol for network virtualization (STT) specified e.g. in internet-draft "draft-davie-stt-07" (work in progress at the time of writing of this patent application). Herein, the acronym RFC stands for a request for comments, which are technical specifications published by the Internet Engineering Task Force (IETF) and that are accessible e.g. via https://www.ietf.org/rfc.html at the time of writing of this patent application. Moreover, the internet-drafts (such as the "draft-davie-stt-07" referred to in the foregoing) are preliminary technical specifications published by the IETF, accessible e.g. via http://www.ietf.org/id-info/ at the time of writing of this patent application.

The VGW 316 is a component of the overlay network implementation. The VGW 316 interconnects the VPN server 304 to the hosts of the data center that are employed for providing the overlay networks that implements the respective virtual networks 304-k. The VGW 316 is provided, by the controller entity 318, with a predefined overlay network configuration for each of the tenants served by the data center 300, and VGW 316 stores (e.g. in a memory and/or in a mass storage device) an overlay mapping table that comprises a plurality of table entries, where each of the table entries defines a mapping between an overlay network identifier (OID) and an identity of a tenant for which the overlay network OID provides a corresponding virtual network 302-k.

In an example, data traffic between the VGW 316 and the VPN server 304 is carried in a VLAN, where the employed VLAN serves to identify the tenant. In this regard, the VLAN is a technique that allows arranging one or more of the hosts that constitute a physical network into a virtual network at the data link layer (also commonly referred to as layer 2 or L2), the virtual network hence constituting a VLAN. A VLAN is identifiable by a VLAN identifier (VLAN ID) assigned thereto, which VLAN ID is typically carried in network layer frames together with (other header information and) transferred data. Addressing and transfer of data frames in the data link layer relies on unique hardware addresses, implying that the data link layer hence provides data transfer over a physical link between hosts. The data link layer is commonly considered to comprise two sublayers, the logical link control (LLC) sublayer and the medium access control (MAC) sublayer, and the hardware address associated with the data link layer of a certain host may hence comprise a MAC address assigned for the certain host. The transfer of data frames in the data link layer is carried out according to data link protocol, such as Ethernet (specified in the IEEE 802.3 series of standards). A number of standardized and vendor-specific techniques or protocols for configuring one or more hosts to operate as a VLAN are known in the art. As a non-limiting example in this regard, the IEEE 802.1Q protocol may be employed to implement the VLAN functionality.

Hence, in such an arrangement the VLAN ID serves as the tenant identifier for the VGW 316, and table entries of the overlay mapping table comprise respective mappings between a VLAN ID and OID. Consequently, upon receiving a packet that is identified by a certain VLAN ID value from the VPN server 304, the VGW 316 accesses the overlay mapping table to identify the table entry that contains the certain VLAN ID value, reads the corresponding OID value from the identified table entry, and forwards the packet to the overlay network that implements the virtual network 302-k identified by the OID value read from the mapping table. Along similar lines, upon receiving a packet that is identified by a certain OID value from the overlay network, the VGW 316 accesses the overlay mapping table to identify the table entry that contains the certain OID value, reads the corresponding VLAN ID value from the identified table entry, and forwards the packet to the VPN server 304 using the VLAN identified by the VLAN ID value read from the mapping table.

As already pointed out in the foregoing, the VPN server 304 is capable of serving multiple tenants, either one at the time or two or more tenants simultaneously, by implementing for each tenant a respective VPN server instance that terminates the S2S VPN tunnel 106-k between the VPN server 304 and the remote VPN server 104-$k$ that serves the tenant's remote network 102-$k$. Moreover, each VPN server instance (and hence the S2S VPN tunnel 106-$k$) is identified by the VNID assigned thereto. The security scheme applied by the VPN server 304 to provide the secure S2S VPN tunnel 106-$k$ may comprise any applicable security scheme known in the art, e.g. Internet Protocol security (IPSec) VPN, the transport layer security/secure sockets layer (TLS/SSL), or layer 2 tunneling protocol (L2TP).

The VPN server 304 configures the S2S VPN tunnel 106-$k$ for the each tenant separately, and the VPN server 304 stores VPN configuration information that comprises respective one or more VPN entries for a plurality of tenants (that is, for each tenant the VPN server 304 is configured for). The VPN entries may be arranged into one or more databases, into one or more tables or into data structure(s) of other suitable type, which may be stored in a memory or a mass storage device in the VPN server 304. Each tenant is assigned a TID that uniquely identifies the tenant within the VPN server 304. The VPN server 304 transfers data to the VGW 316 and received data from the VGW 316 via a VLAN that is assigned to the tenant k, which is identifiable by the VLAN ID assigned thereto. In the following, we may denote the tenant ID assigned to a tenant k as TID(k) and the VLAN ID assigned to the tenant k as VLAN-ID(k).

The VPN configuration information comprises at least a multi-tenant forwarding table, which comprises a respective forwarding table entry (FTE) for a plurality of tenants. In an example, a FTE of the multi-tenant forwarding table for a tenant k includes at least the following pieces of information that are specific to the tenant k in the framework of the data center 300:

The tenant identification TID(k) for the tenant k,
The VLAN identification VLAN-ID(k) that identifies the VLAN assigned for the tenant k,
A next hop L3 address assigned to the overlay network that implements the virtual network 302-$k$ for the tenant k, denoted as IX(k) to enable forwarding data received from the remote network 102-$k$ to the virtual network 302-$k$,
A next hop L2 address assigned to the interface towards the overlay network that implements the virtual network 302-$k$ for the tenant k, denoted as MX(k), to enable forwarding data received from the remote network 102-$k$ to the virtual network 302-$k$,
A local L3 address assigned to the VPN server 304, denoted as IVX(k), for use by the VGW 316 as the next hop address that serves as L3 interface towards the remote network 102-$k$ from the virtual network 302-$k$,
A local L2 address assigned to the VPN server 304, denoted as MVX(k), for use by the VGW 316 as the next hop address that serves as L2 interface towards the remote network 102-$k$ from the virtual network 302-$k$.

In an example, the next hop L2 address MX(k) and/or the next hop L2 address MVX(k) are not included in the FTEs but an address resolution protocol (ARP) may be employed to resolve a respective next hop L2 address MX(k) or MVX(k) (e.g. a MAC address) corresponding to a given L3 next hop address IX(k) or IVX(k) (e.g. an IP address), as known in the art.

The VPN configuration information further comprises VPN tunnel information that defines at least the mapping between a tenant and the VPN server instance in the VPN server 304, e.g. as a mapping between a respective pair of a VNID and a TID for a plurality of VPN server instances (i.e. for a plurality of VNIDs). As an example, this information may be provided by VPN tunnel information table that includes a respective table entry for a plurality of VPN server instances and where each table entry includes at least the following pieces of information:

The tenant identification TID(k) for the tenant k,
The VNID that identifies the VPN server instance and S2S VPN tunnel 106-$k$ associated with the tenant k, denoted as VNID(k), The VPN configuration information may further comprise a security policy table that stores information that defines, for a plurality of tenants, a respective procedure for directing outbound packets from the virtual network 302-$k$ to the remote network 102-$k$ via the respective S2S VPN tunnel 106-$k$. In an example, the procedure definition stored in the security policy table for a certain tenant may be provided as a table entry that includes a match rule and a corresponding action. Basically, an outbound packet that conforms to a match rule of a given table entry is processed according to the action defined in the given table entry. The match rule includes a TID associated with the respective table entry (i.e. the tenant ID for which the table entry is provided). The match rule typically further specifies a local L3 subnet and a remote L3 subnet, possibly together with one or more further matching criteria, whereas the corresponding action may specify the S2S VPN tunnel 106-$k$ to be used and/or one or more security sets to be applied to an outbound packet that conforms to the match rule. The usage of tenant ID as part of the match rule allows for using overlapping and/or partially overlapping L3 address spaces for multiple tenants.

Figure 4:
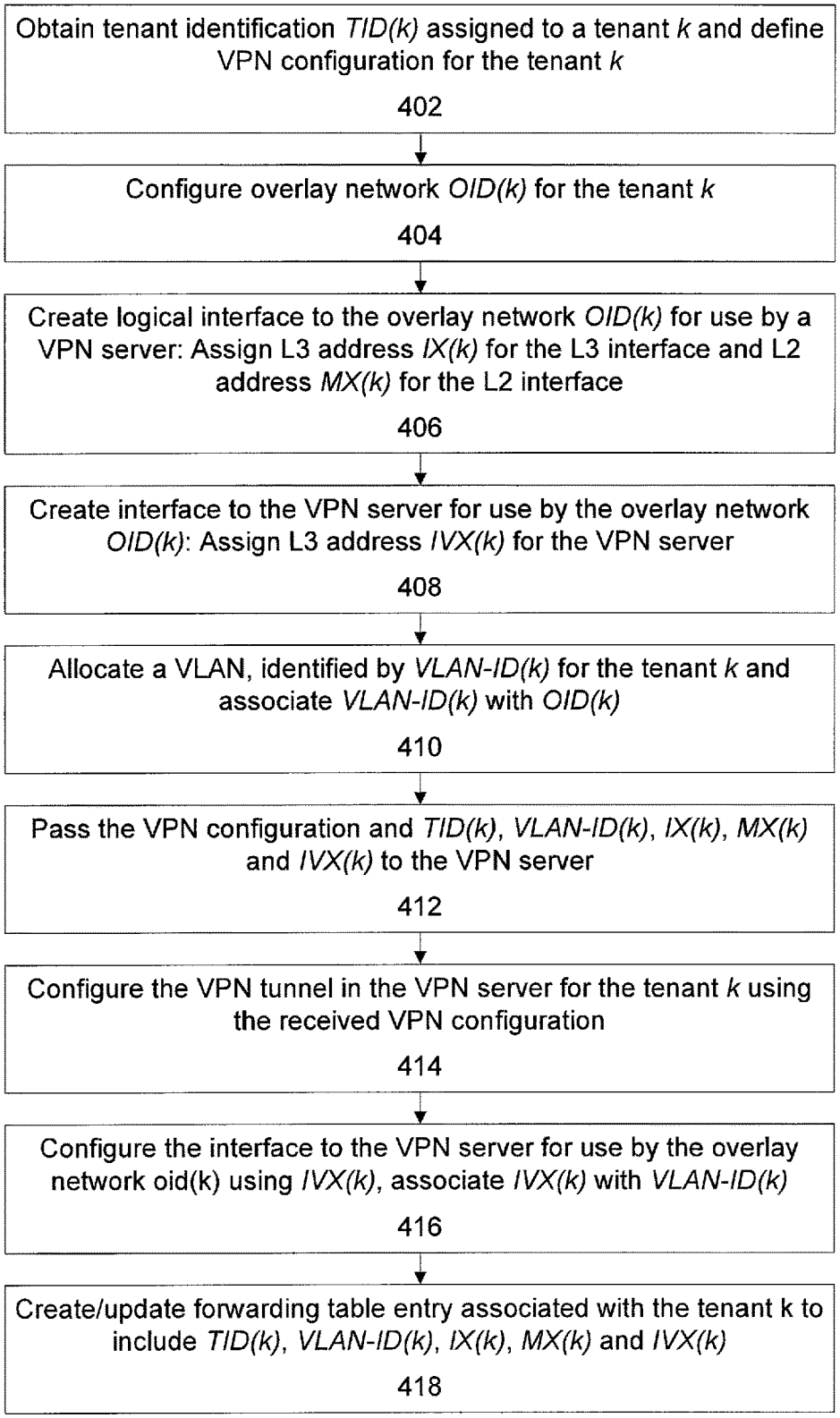
FIG. 4 depicts a flow diagram according to an example embodiment.

An aspect of joint operation of the VPN server 304, the VGW 316 and the control entity 318 is described in the following with references to FIG. 4. In this regard, FIG. 4 depicts an outline of a method 400, which serves as an exemplifying method for configuring these elements of the data center 300 to provide an overlay network that serves as the virtual network 302-$k$ for a certain tenant.

The method 400 proceeds from establishment of the S2S VPN tunnel 106-$k$ for tenant k. From the tunnel establishment procedure the control entity 318 obtains the tenant ID that identifies the tenant k for which the S2S VPN tunnel 106-$k$ has been established, i.e. TID(k), as indicated in block 402. Upon obtaining the TID(k), the control entity 318 initiates configuration of the overlay network that will serve as the virtual network 302-$k$ for the tenant k.

This virtual network is identified by an overlay network identifier (overlay network ID or OID) assigned thereto, as indicated in block 404. Herein, we denote the OID assigned to the overlay network created for providing the virtual network 302-$k$ for the tenant k by OID(k).

Configuration of the overlay network OID(k) involves the control entity 318 creating a logical interface to the overlay network OID(k) by assigning a L3 address and a L2 address that serve as the interface to the overlay network OID(k), as indicated in block 406. These addresses are specific to the tenant k and herein we denote the L3 address of the logical interface to the overlay network OID(k) as IX(k) and the L2 address of the logical interface to the overlay network OID(k) as MX(k). As an example, the L3 address IX(k) may comprise an IP address and the L2 address MX(k) may comprise a MAC address. The L3 address IX(k) and the L2 address MX(k) are useable by the VPN server 304 as the respective next hop addresses in routing data traffic received via the S2S VPN tunnel 106-$k$ from the remote network 102-$k$ to the overlay network OID(k) that serves to provide the virtual network 302-$k$.

Configuration of the overlay network OID(k) further involves the control entity 318 assigning a L3 address in the overlay network OID(k) as the L3 address of the VPN server

304, as indicated in block 408. The L3 address of the VPN server 304 is denoted as IVX(k) and this address is specific for the tenant k. Along the lines of the example provided above, the L3 address IVX(k) may comprise an IP address. The L3 address IVX(k) is useable by the hosts of the overlay network OID(k) as the L3 address of the VPN server 304 for packets that are to be transmitted to the remote network 102-k. The L3 address IVX(k) hence serves as the next hop address in routing data traffic from the overlay network OID(k) towards the remote network 102-k via the respective VPN server instance of the VPN server 304.

The control entity 318 further allocates a VLAN to the overlay network OID(k) and configures the VGW 316 to associate the allocated VLAN to the overlay network OID (k), as indicated in block 410. Herein, we denote the VLAN ID of the allocated VLAN allocated for the tenant k by VLAN-ID(k). This allocation may involve the control entity 318 providing the VGW 316 with the VLAN-ID(k) and configuring the WGW 316 to apply this mapping between the OID(k) and VLAN-ID(k) for the data traffic to/from the VPN server 304. The VGW 316 may store the mapping between the OID(k) and VLAN-ID(k) as a respective entry in an overlay mapping table stored therein for subsequent use. As described in the foregoing, the overlay mapping table may comprise a respective entry to provide the mapping between the OID and the VLAN ID for a plurality of tenants. With the information included in the overlay mapping table, the data traffic between the VPN server 304 and the VGW 316 is carried in the VLAN identified by the VLAN-ID(k), whereas the data traffic between the VGW 316 and the overlay network (at L3) is carried in an overlay channel identified by the OID(k). This mapping between the VLAN-ID(k) and OID(k), effectively, causes the VPN server 304 and the overlay network OID(k) at L3 to communicate with each other as if they were entities of the same L2 network.

Once the configuration operations from block 402 to 410 have been completed, the control entity 318 passes VPN configuration information to the VPN server 304 together with overlay configuration information that comprises at least the following pieces of information (block 412):

the tenant identification TID(k),
the VLAN identifier VLAN-ID(k),
the L3 address IX(k) assigned for the L3 interface to the overlay network OID(k),
the L2 address MX(k) assigned for the L2 interface to the overlay network OID(k), and
the L3 address IVX(k) assigned for the VPN server 304 for use by the overlay network OID(k), Upon receiving the VPN configuration information and the overlay configuration information from the control entity 318, the VPN server 304 sets up the S2S VPN tunnel 106-k, as indicated in block 414, sets the local L3 address IVX(k) and the local L2 address MVX(k) to serve as the interface for the VGW 316 to address the VPN server 304 for data traffic of the tenant k and also associate the L3 address IVX(k) and the L2 address MVX(k) with the VLAN-ID(k), as indicated in block 416, thereby assigning the VLAN-ID (k) as the identification of the VLAN employed to transfer data between the VPN server 304 and the VGW 316 for the tenant k. Furthermore the VPN server 304 creates (or updates) a FTE associated with the tenant k (identified by the tenant identifier value TID(k)) by using the above-mentioned pieces of overlay configuration information received from the control entity 318, as indicated in block 418.

As described in the foregoing, configuration of the VPN server 304 and the VGW 316 operation according to the outline of the method 400 to provide the overlay network to serve as the virtual network 304-k for the tenant k may be initiated in response to establishment of the S2S VPN tunnel 106-k. In an example, the overlay network will be set up only in case no overlay network for the tenant k is currently available in the data center 300. Such a situation may occur e.g. in case there is already an existing S2S VPN tunnel between the remote VPN server 104-k and the VPN server 304 upon establishment of the S2S VPN tunnel 106-k. In this scenario, the existing overlay network will be applied for providing the virtual network 304-k for the both S2S VPN tunnels.

An example of the VGW 316 operation and the VPN server 304 operation for forwarding data packets from the overlay network that implements the virtual network 302-k towards the remote network 102-k is described in the following with references to an exemplifying method 500 depicted in FIG. 5. In the following, we refer to a single data packet, while the description directly generalizes into repeating the procedure for a sequence of data packets.

The overlay network service routes a data packet in an overlay tunnel in the overlay network OID(k) that is targeting the remote network 102-k towards the VPN server 304 by using the L3 address IVX(k) as the next hop address, as indicated in block 502.

The VGW 316 terminates the overlay tunnel in the overlay network OID(k) that carries the data packet towards the remote network 102-k and forwards the data packet received via the overlay tunnel to the VPN server 304 using the VLAN identified by the VLAN-ID(k), as indicated in block 504. This may be enabled by the overlay mapping table described in the foregoing in context of the block 410 of FIG. 4, e.g. such that the VGW 316 identifies the table entry that stores the OID(k) and uses the VLAN ID of the identified table entry as the VLAN-ID(k). As an example of forwarding the data packet using the VLAN, the data packet received from the overlay tunnel may be forwarded to the VPN server 304 together with the VLAN-ID(k) to indicate the employed VLAN. This may be accomplished by augmenting the data packet received from the overlay tunnel by the VLAN-ID(k), e.g. by inserting or writing the VLAN-ID (k) to an appropriate element of the employed L2 protocol. As a non-limiting example in this regard, the data packets may be provided as Ethernet frames (IEEE 802.3), while the IEEE 802.1Q standard may be employed to enable VLAN functionality: consequently, the VLAN-ID(k) may be carried in the 802.1Q header between the source MAC address and the EtherType/length fields of an Ethernet frame.

The VPN server 304 identifies the tenant k associated with the VLAN employed to carry the data packet from the VGW 316 to the VLAN server 304 on basis of the VLAN-ID(k) received from the VGW 316, as indicated in block 506. In this regard, the VPN server 304 may access the multi-tenant forwarding table to identify a FTE therein that includes the VLAN-ID(k) received from the VGW 316 and read the tenant identification TID(k) from the identified FTE.

The VPN server 304 identifies the S2S VPN tunnel 106-k associated with the tenant k on basis of the tenant identification TID(k), as indicated in block 508, terminates the VLAN (e.g. by stripping off the VLAN-ID(k) carried in the data packet received via the VLAN and forwards the data packet received from the VGW 316 via the S2S VPN tunnel 106-k to the remote network 102-k, as indicated in block 510. In this regard, the VPN server 304 may apply the TID(k) read from the multi-tenant forwarding table to identify a table entry of the security policy table where the match rule includes the TID(k) found from the identified FTE of the multi-tenant forwarding table and to employ action(s) defined in the identified table entry of the security policy table to forward the data packet received from the VGW 316 correctly to the remote network 102-*k* using the associated S2S VPN tunnel 106-*k*.

An example of the VPN server 304 operation and the VGW 316 operation for forwarding data packets from the remote network 102-*k* to the overlay network that implements the virtual network 302-*k* is described in the following with references an exemplifying method 600 depicted in to FIG. 6. In the following, we refer to a single data packet, while the description directly generalizes into repeating the procedure for a sequence of data packets.

The VPN server 304 receives a data packet from the remote network 102-*k* via the S2S VPN tunnel 106-*k* and obtains the tenant identification TID(k) associated with the S2S VPN tunnel 106-*k*, as indicated in block 602. In this regard, the VPN server 304 terminates the S2S VPN tunnel 106-*k* and extracts the data packet received therefrom for forwarding towards the virtual network 304-*k* via the VGW 316. The VPN server 304 may obtain the tenant identification TID(k) associated with the S2S VPN tunnel 106-*k* by identifying a table entry of the VPN tunnel information table that includes the VNID of the S2S VPN tunnel 106-*k* from which the data packet was received and reading the TID(k) from the identified table entry.

The VPN server 304 determines the VLAN identifier VLAN-ID(k) associated with the TID(k) and uses the VLAN so determined for forwarding the data packet received from the S2S VPN tunnel 106-*k* to the VGW 316, as indicated in block 604. In this regard, the VPN server 304 may search the multi-tenant forwarding table to identify a FTE therein that includes the TID(k) associated with the S2S VPN tunnel 106-*k* and read the VLAN identification VLAN-ID(k) from the identified FTE.

The VPN server 304 forwards the data packet received from the S2S VPN tunnel 106-*k* to the VGW 316 using the VLAN defined by the VLAN-ID(k) read from the multi-tenant forwarding table, as indicated in block 606. As an example in this regard, the VPN server 304 may forward the data packet to the VGW 316 together with the VLAN-ID(k) to indicate the employed VLAN. This may be accomplished by augmenting the data packet received from the S2S VPN tunnel 106-*k* by the VLAN-ID(k), e.g. by inserting or writing the VLAN-ID(k) to an appropriate element of the employed L2 protocol. Along the lines described in the foregoing in context of the VGW using the VLAN for transmitting the data packet to the VPN server 304, as a non-limiting example in this regard, the data packets may be provided as Ethernet frames (IEEE 802.3), while the IEEE 802.1Q standard may be employed to enable VLAN functionality by carrying the VLAN-ID(k) in the 802.1Q header between the source MAC address and the EtherType/length fields of an Ethernet frame.

Upon receiving the data packet via the VLAN from the VPN server 304, the VGW 316 identifies the overlay network associated with the employed VLAN, as indicated in block 608. In this regard, the VGW 316 may access the overlay mapping table by identifying the table entry that stores the VLAN-ID(k) that identifies the employed VLAN and using the OID of the identified table entry as the OID(k). Consequently, the VGW forwards the data packet received from the VPN server 304 via the VLAN to in an overlay tunnel to the overlay network OID(k) for transfer towards its destination in the L3 overlay network and, finally, to its destination in the virtual network 302-*k*, as indicated in block 610.

An advantage of the arrangement according to the methods 500 and/or 600 outlined in the foregoing is that it allows a straightforward implementation of the VPN server 304 and the VGW 316, to an extent making it feasible to provide a hardware implementation of the VPN server 304 and the VGW 316 that is configured to operate along the lines of the method 600 and/or 600, thereby providing a high-performance overlay network solution for a multi-tenant data center.

Another advantage of the arrangement according to the methods 500 and/or 600 outlined in the foregoing is decoupling of the overlay network implementation by the VGW 316 from the VPN functionality provided by the VPN server 304. Consequently, the designer of the data center is provided with an option to choose the overlay network implementation of his/her choosing or to replace the employed overlay network implementation with another one without affecting the operation of the VPN server 304.

Figure 7:
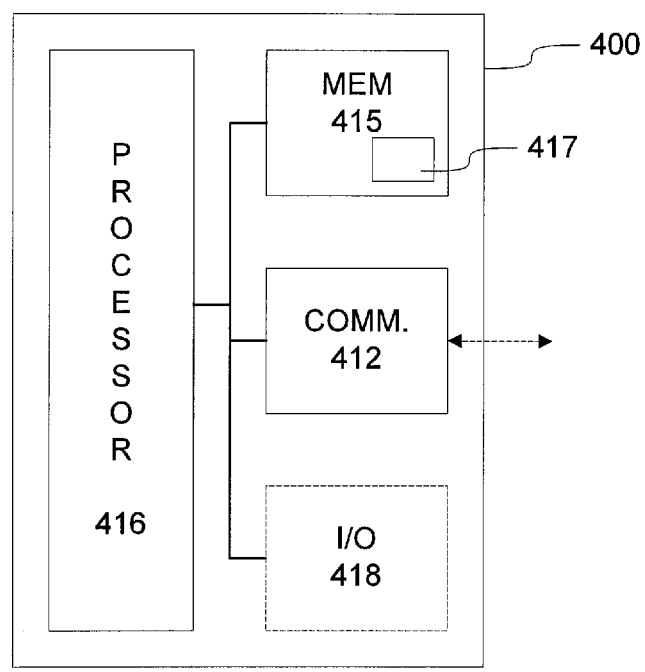
FIG. 7 illustrates a block diagram of some components of an apparatus according to an example embodiment.

FIG. 7 illustrates a block diagram of some components of an exemplifying apparatus 400. The apparatus 400 may comprise further components, elements or portions that are not depicted in FIG. 4. The apparatus 400 may be employed in implementing e.g. the VPN server 304, the VGW 316 or the control entity 318.

The apparatus 400 comprises a communication portion 412 for communication with other devices. As a few examples, the communication portion 412 may enable communication between the VPN server 304 and a remote VPN server 104-*k* and/or communication between the VPN sever 304 and the VGW 316. In this regard, the communication portion 412 comprises at least one communication apparatus that enables wired communication with other apparatus, and the communication portion 412 may comprise one or more further (wireless or wired) communication apparatuses. A communication apparatus of the communication portion 412 may also be referred to as a respective communication means.

The apparatus 400 further comprises a processor 416 and a memory 415 for storing data and computer program code 417. The memory 415 and a portion of the computer program code 417 stored therein may be further arranged to, with the processor 416, to provide a control function for controlling operation of the apparatus 400 and, in particular, cause the apparatus 400 to operate as the VPN server 304, the VGW 316 or the control entity 318 as described in the foregoing. The memory 415 and a portion of the computer program code 417 stored therein may be further arranged to, with the processor 416, to provide a control function for controlling operation of a communication apparatus of the communication portion 412, possibly together with a control portion or a control function that may be provided within the respective communication apparatus of the communication portion 412. These control functions may be, separately or jointly, referred to as control means (of the apparatus 400).

The apparatus 400 may further comprise user I/O (input/output) components 418 that may be arranged, possibly together with the processor 416 and a portion of the computer program code 417, to provide a user interface for receiving input from a user of the apparatus 400 and/or providing output to the user of the apparatus 400. The user I/O components 418 may comprise hardware components such as a display, a touchscreen, a touchpad, a mouse, a keyboard, and/or an arrangement of one or more keys or buttons, etc. The user I/O components 418 may be also referred to as peripherals. The processor 416 may be arranged to control operation of the apparatus 400 e.g. in accordance with a portion of the computer program code 417 and possibly further in accordance with the user input received via the user I/O components 418 and/or in accordance with information received via the communication portion 412. Although the processor 416 is depicted as a single component, it may be implemented as one or more separate processing components. Similarly, although the memory 415 is depicted as a single component, it may be implemented as one or more separate components, some or all of which may be integrated/removable and/or may provide permanent/semi-permanent/dynamic/cached storage.

The computer program code 417 stored in the memory 415, may comprise computer-executable instructions that control one or more aspects of operation of the apparatus 400 when loaded into the processor 416. As an example, the computer-executable instructions may be provided as one or more sequences of one or more instructions. The processor 416 is able to load and execute the computer program code 417 by reading the one or more sequences of one or more instructions included therein from the memory 415. The one or more sequences of one or more instructions may be configured to, when executed by the processor 416, cause the apparatus 400 to carry out operations, procedures and/or functions described in the foregoing in context of the VPN server 304, the VGW 316 or the control entity 318. Hence, the apparatus 400 may comprise at least one processor 416 and at least one memory 415 including the computer program code 417 for one or more programs, the at least one memory 415 and the computer program code 417 configured to, with the at least one processor 416, cause the apparatus 400 to perform operations, procedures and/or functions described in the foregoing in context of the VPN server 304, the VGW 316 or the control entity 318.

The computer programs stored in the memory 415 may be provided e.g. as a respective computer program product comprising at least one computer-readable non-transitory medium having the computer program code 417 stored thereon, the computer program code, when executed by the apparatus 400, causes the apparatus 400 at least to perform operations, procedures and/or functions described in the foregoing in context of the VPN server 304, the VGW 316 or the control entity 318. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

Although functions have been described with reference to certain features, those functions may be performable by other features whether described or not. Although features have been described with reference to certain embodiments, those features may also be present in other embodiments whether described or not.

What is claimed is:

1. A method, comprising:
    operating, in a data center, a multi-tenant virtual private network (VPN) server to relay data packets between a VPN tunnel that connects the multi-tenant VPN server to a remote network of a tenant and an overlay network service that implements a VPN for the tenant within the data center,
    wherein the data packets between the multi-tenant VPN server and the overlay network service are carried in a virtual local area network (VLAN) assigned for the tenant wherein the multi-tenant VPN server stores a multi-tenant forwarding table that stores a mapping between the tenant and the VLAN assigned for the tenant of a plurality of tenants.

2. A method according to claim 1, wherein the multi-tenant forwarding table stores a respective table entry for each of the plurality of tenants, each said table entry defining a mapping between a tenant identifier and a VLAN identifier assigned for the respective tenant.

3. A method according to claim 1, further comprising
    assigning the VLAN for the tenant in response to establishing the VPN tunnel, and
    storing the mapping between the tenant and the VLAN in the multi-tenant forwarding table.

4. A method according to claim 1, wherein operating the multi-tenant VPN server to relay the data packets further comprises forwarding a data packet received from the VPN tunnel to the overlay network service, comprising
    obtaining a tenant identifier associated with the VPN tunnel,
    obtaining a VLAN identifier associated with the obtained tenant identifier, and
    forwarding the data packet received from the VPN tunnel to the overlay network service using the VLAN identified by the obtained VLAN identifier.

5. A method according to claim 4, wherein the forwarding comprises
    augmenting the data packet received from the VPN tunnel to include the obtained VLAN identifier, and
    transmitting the augmented data packet to the overlay network service.

6. A method according to claim 1, wherein operating the multi-tenant VPN server to relay the data packets further comprises forwarding a data packet received from the overlay network service to the VPN tunnel, comprising:
    receiving a data packet from the overlay network service via the VLAN, wherein the VLAN is associated with a VLAN identifier,
    obtaining a tenant identifier associated with the VLAN identifier, and
    forwarding the data packet received from the overlay network service to the VPN tunnel associated with the obtained tenant identifier.

7. A non-transitory computer readable medium comprising program instructions stored thereon for causing an apparatus for operating a multi-tenant virtual private network (VPN) service to perform at least the following:
    relaying data packets between a virtual private network (VPN) tunnel that connects the apparatus to a remote network of a tenant and an overlay network service that implements a VPN for the tenant within a data center,
    wherein the data packets between the apparatus and the overlay network service are carried in a virtual local area network (VLAN) assigned for the tenant, and
    wherein the apparatus stores a multi-tenant forwarding table that stores a mapping between the tenant and the VLAN assigned for the tenant for a plurality of tenants.

8. An apparatus comprising:
    at least one processor; and
    at least one memory including computer program code;

the at least one memory and the computer program code configured to, with the at least one processor, cause the apparatus at least to perform:
  relaying data packets between a virtual private network (VPN) tunnel that connects the apparatus to a remote network of a tenant and an overlay network service that implements a VPN for the tenant within a data center,
  wherein the data packets between the apparatus and the overlay network service are carried in a virtual local area network (VLAN) assigned for the tenant, and
  wherein the apparatus is configured to store a multi-tenant forwarding table that stores a mapping between the tenant and the VLAN assigned for the tenant of a plurality of tenants.

9. An apparatus according to claim 8, wherein the multi-tenant forwarding table stores a respective table entry for each of the plurality of tenants, each said table entry defining a mapping between a tenant identifier and a VLAN identifier assigned for the respective tenant.

10. An apparatus according to claim 8, further configured to:
  assign the VLAN for the tenant in response to establishing the VPN tunnel, and
  store the mapping between the tenant and the VLAN in the multi-tenant forwarding table.

11. An apparatus according to claim 8, wherein relaying data packets comprises forwarding a data packet received from the VPN tunnel to the overlay network service, comprising
  obtaining a tenant identifier associated with the VPN tunnel,
  obtaining a VLAN identifier associated with the obtained tenant identifier, and
  forwarding the data packet received from the VPN tunnel to the overlay network service using the VLAN identified by the obtained VLAN identifier.

12. An apparatus according to claim 11, wherein the forwarding comprises
  augmenting the data packet received from the VPN tunnel to include the obtained VLAN identifier, and
  transmitting the augmented data packet to the overlay network service.

13. An apparatus according to claim 8, wherein relaying the data packets comprises forwarding a data packet received from the overlay network service to the VPN tunnel, comprising:
  receiving the data packet from the overlay network service via the VLAN, wherein the VLAN is associated with a VLAN identifier,
  obtaining a tenant identifier associated with the VLAN identifier, and
  forwarding the data packet received from the overlay network service to the VPN tunnel associated with the obtained tenant identifier.

14. An apparatus according to claim 13, wherein the forwarding comprises
  receiving the VLAN identifier in a data field of the data packet received from the overlay network service,
  processing the received data packet by removing the data field that includes the VLAN identifier, and
  transmitting the processed data packet via the VPN tunnel.

15. A system comprising:
  an apparatus configured to relay data packets between a virtual private network (VPN) tunnel that connects the apparatus to a remote network of a tenant and an overlay network service that implements a VPN for the tenant within a data center,
  wherein the data packets between the apparatus and the overlay network service are carried in a virtual local area network (VLAN) assigned for the tenant,
  wherein the apparatus is configured to store a multi-tenant forwarding table that stores a mapping between the tenant and the VLAN assigned for the tenant for a plurality of tenants; and
  a VLAN gateway configured to interface the overlay network service within the data center in dependence of the VLAN employed in transfer of the data packets between the apparatus and the overlay network service,
  wherein the VLAN gateway is configured to store an overlay network mapping table that stores a mapping between the VLAN and the overlay network of a plurality of VLANs.

16. A system according to claim 15, wherein the overlay network mapping table stores a respective table entry for each of the plurality of VLANs, each said table entry defining a mapping between a VLAN identifier and an overlay network identifier for the respective VLAN.

17. A system according to claim 15, wherein the VLAN gateway is configured to forward a data packet received from the apparatus to the overlay network service, comprising
  obtaining a VLAN identifier associated with the employed VLAN,
  obtaining an overlay network identifier associated with the obtained VLAN identifier, and
  forwarding the data packet received from the apparatus to the overlay network identified by the obtained overlay network identifier.

18. A system according to claim 17, wherein obtaining the VLAN identifier comprises receiving the VLAN identifier in a data field of the data packet received from the apparatus, and wherein forwarding the data packet comprises
  processing the received data packet by removing the data field that includes the VLAN identifier, and
  transmitting the processed data packet to the overlay network.

19. A system according to claim 15, wherein the VLAN gateway is;
  configured to forward a data packet received from the overlay network service to the apparatus, comprising
  receiving the data packet from the overlay network identified by an overlay network identifier,
  obtaining a VLAN identifier associated with the overlay network identifier, and
  forwarding the data packet received from the overlay network to the apparatus via the VLAN identified by the obtained VLAN identifier.

20. A system according to claim 19, wherein the forwarding comprises
  augmenting the data packet received from the overlay network to include the obtained VLAN identifier, and
  transmitting the augmented data packet to the apparatus.

* * * * *